(12) United States Patent
Sekioka

(10) Patent No.: US 6,422,573 B1
(45) Date of Patent: Jul. 23, 2002

(54) MONOLAYER METAL GASKETS

(75) Inventor: Kenichi Sekioka, Osaka-fu (JP)

(73) Assignee: Nippon Gasket Co., Ltd., Osaka-fu (JP)

( * ) Notice: Subject to any disclaimer, the term of this patent is extended or adjusted under 35 U.S.C. 154(b) by 29 days.

(21) Appl. No.: 09/613,457

(22) Filed: Jul. 10, 2000

(30) Foreign Application Priority Data

Jul. 22, 1999 (JP) .............................................. 11-208092

(51) Int. Cl.$^7$ ................................................. F02F 11/00
(52) U.S. Cl. ........................................ 277/594; 277/595
(58) Field of Search ................................ 277/593, 594, 277/595, 592

(56) References Cited

U.S. PATENT DOCUMENTS 5,924,700 A * 7/1999 Kobayashi .............. 277/594 X
6,231,049 B1 * 5/2001 Ridgway .................... 277/595

FOREIGN PATENT DOCUMENTS

| JP | 88769/1992 | 7/1992 |
|----|------------|--------|
| JP | 44847/1993 | 2/1993 |
| JP | 74343/1994 | 3/1994 |
| JP | 233105/1996 | 9/1996 |
| JP | 285080/1996 | 11/1996 |

* cited by examiner

Primary Examiner—Robert J. Sandy
Assistant Examiner—Karlena D. Schwing
(74) Attorney, Agent, or Firm—Browdy and Neimark

(57) ABSTRACT

A monolayer metal gasket is disclosed in which variations in radial width of a core plate around bore apertures help regulate a sealing stress throughout around bore apertures. The monolayer metal gasket is comprised of a core plate extending around the bore apertures and a perimetral member surrounding throughout the core plate. The core plate is varied in its own radial width circumferentially of every bore aperture in such a manner as to become narrow at areas neighboring tightening holes while wide at the remainder. In this monolayer metal gasket, the sealing stress around the bore apertures may be compensated in part by varying the radial width of the core plate circumferentially of every bore aperture.

3 Claims, 7 Drawing Sheets

MONOLAYER METAL GASKETS

BACKGROUND OF THE INVENTION

1. Field of the Invention

The present invention relates to a monolayer metal gasket adapted disposed between the mating surfaces of, for example, a cylinder block and cylinder head, and composed of a core plate surrounding bore apertures and a perimetral member extending throughout the entire perimeter of the core plate.

2. Description of the Prior Art

Conventionally, there has been well known a monolayer metal gasket disclosed in Japanese Patent Laid-Open No. 44847/1993, which is of an elastic metal member provided thereon with beads extending around cylinder bore apertures and made reduced in thickness by etching, with the exception of perimetric edges defining the cylinder bore apertures.

Japanese Utility Model Laid-Open No. 88769/1992 discloses a metallic head gasket making it possible to control the sealing around the bore apertures and the sealing about other perforations independently of each other. The bore apertures are kept sealed with metallic plates having beads extending around the bore apertures, whereas other perforations are sealed with metallic thin plates made with half beads formed about the perforations.

Also, a monolayer head gasket has been well known, which is adapted to use for an open-deck type engine having a cylinder block provided therein with water jackets surrounding continually the cylinder bores. The monolayer head gasket is disclosed in, for example, Japanese Patent Laid-Open Nos. 233105/1996 and 285080/1996, where the head gasket consists of a metal plate great in thickness for sealing around cylinder bores at areas inside the water jackets and another metal plate thin in thickness for sealing around the cylinder bores at areas outside the water jackets, the metal plates unlike in thickness being jointed together by lap welding.

Any prior head gasket enumerated above, as shown in FIG. 13, is comprised of a core plate 2P surrounding bore apertures 3P and a perimetral member 1P extending throughout the entire perimeter 6P of the core plate 2P. Moreover, the core plate 2P is provided thereon with beads 7P extending around the bore apertures 3P and has a radial width uniform throughout circumferentially of the bore apertures 3P. Thus, none of the prior head gaskets realizes the technical concept of compensating for the sealing stress occurring around the bore apertures. What no prior core plate 2P, as explained just above, varies continually in width along the bore apertures apparently results in failure, under some tightening conditions, in making the sealing stress uniform throughout around the bore apertures, especially, in compensating for the sealing stress at areas neighboring tightening holes 5P.

The conventional head gaskets constructed as described above have a disadvantage of the reduced freedom of gasket design, flexibility and adaptability when employed in many kinds of engines, which are diverse in tightening conditions of bolts to join the cylinder head to the cylinder block. In some tightening conditions to mount the cylinder head on the cylinder block, the prior head gaskets have been too tough to ensure the uniformity of the sealing stress around the bore apertures 3P, especially, at the areas neighboring the tightening holes 5P.

In closed-deck type engines having the water jackets provided in an intermittent manner around the cylinder bores, on the other hand, the cylinder block is mostly great in rigidity or stiffness, compared with the open-deck type engines, and therefore has the tendency to somewhat higher tightening or hold-down load, compared with that in the open-deck type engine. This, in some design requirements of engine, causes the sealing stress around the bore apertures a local rise at the areas nearby the tightening holes, thus making it tough to ensure the sealing stress that is uniform throughout around the bore aperture. In order to cope with the drawback in the sealing stress around the bore aperture, the metal gasket is required to have means for balancing minutely the sealing stress throughout around the bore aperture.

In the monolayer metal gasket comprised, as described above, of the thick core plate surrounding the bore apertures and a perimetral member extending throughout the entire perimeter of the core plate, the core plate uniform in radial width throughout around the bore apertures experiences the sealing stress distribution such that the stress, though becoming high at areas neighboring the tightening holes, lowers at other areas remote from the tightening holes.

The head gaskets for latest engines requiring low rigidity or/and high combustion pressure frequently involve a major problem to be solved, in which minute variations in the sealing stress occurring circumferentially around the bore apertures has an influence undesirable from the view point of sealing performance of the metal gasket.

SUMMARY OF THE INVENTION

The present invention has as its primary object to overcome the problem described just above and, especially, the provision of a monolayer metal gasket that may be preferably used in a closed-deck type engine, in which the tightening load is preselected at a somewhat high level. More particularly, the present invention provides a monolayer metal gasket simple in construction, in which a thick core plate surrounding bore apertures varies continually in radial width circumferentially of the bore apertures to compensate for minute variations in sealing stress around the bore apertures, thereby ensuring the uniformity of the sealing stress throughout around the bore apertures.

The present invention is concerned with a monolayer metal gasket adapted to be used disposed between mating surfaces of a cylinder block and cylinder head held together with tightening bolts, which comprises a core plate formed in combination of areas surrounding bore apertures and provided thereon with beads extending around the bore apertures and bridges connecting in series any adjacent two of the areas to one another, and a perimetral member extending throughout around the core plate and joining with a perimetric edge of the core plate, the core plate being made greater in thickness than the perimetral member; the improvement wherein the areas of the core plate surrounding the bore apertures are made varied continually in radial width, depending on a sealing stress distribution around the bore apertures, whereby the variation in radial width of the core plate circumferentially of any bore apertures results in compensating partly for the sealing stress distribution around the bore apertures.

In accordance with an aspect of the present invention, a monolayer metal gasket is disclosed, wherein the bridges in the core plate have any width extending across an area between any adjoining bore apertures, which width may be made either equal to or different from each other at every area between the adjoining bore apertures.

In another aspect of the present invention, a monolayer metal gasket is disclosed, wherein the core plate around the bore apertures is made minimum in its own radial width at areas neighboring tightening holes formed in the perimetral member.

In the monolayer metal gasket of the present invention constructed as described just above, the minute variations in sealing stress occurring around the bore apertures may be properly, easily compensated or regulated with only changing partly the radial width of the core plate circumferentially of the bore aperture, without requiring altering partly the height of the bead raised on the core plate, whereby the sealing stress may be kept uniform throughout around every bore aperture. Thus, the monolayer metal gasket of the present invention is simple in construction and advantageous to easy regulation of the sealing stress, especially, when applied to the closed-deck type engine in which the water jackets are provided in an intermittent manner around the cylinder bores. Even if the areas neighboring the tightening holes experienced a considerably high tightening force, the sealing stress distribution would be kept uniform throughout around every bore aperture by means of the core plate varied in radial width circumferentially of the bore apertures, thereby helping ensure the improvement in sealing performance.

DETAILED DESCRIPTION OF THE PREFERRED EMBODIMENTS

Figure 1:
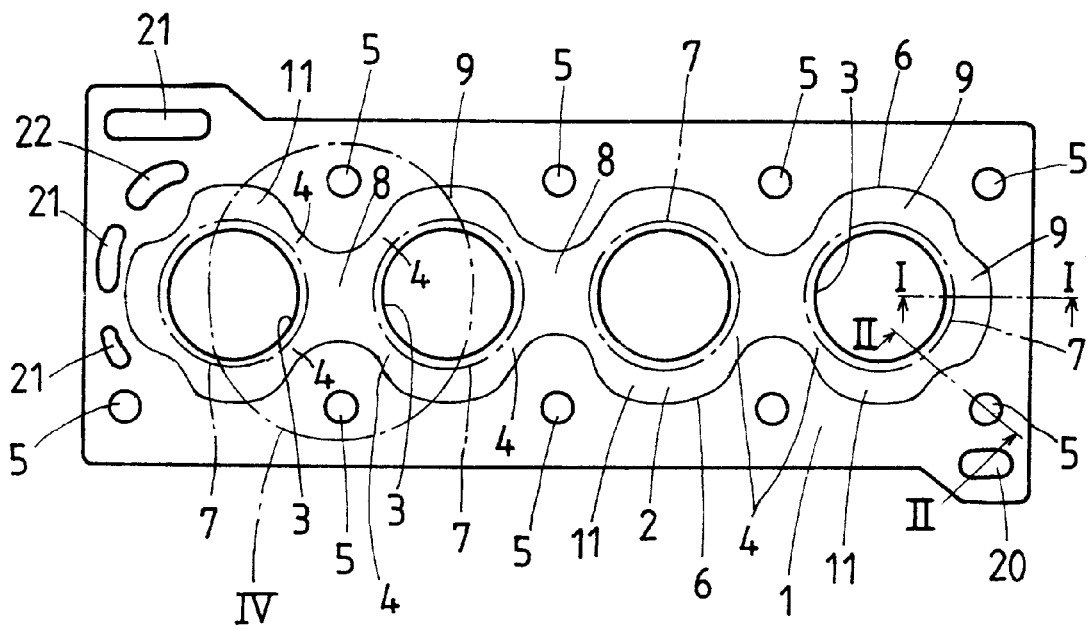
FIG. 1 is a top plan view showing a preferred embodiment of a monolayer metal gasket according to the present invention.

The monolayer metal gasket according to the present invention will be in detail explained below with reference to the preferred embodiments of the present invention shown in accompanying drawings.

A monolayer metal gasket according to the present invention is adapted to be disposed between mating surfaces of a cylinder block and a cylinder head, which are jointed together with tightening bolts. The metal gasket is comprised of a core plate 2 surrounding bore apertures 3 and provided thereon with beads 7 extending around the bore apertures 3, and a perimetral member 1 extending throughout around the core plate 2 and joining with a perimetric edge 6 of the core plate 2. The core plate 2 is made greater in thickness than the perimetral member 1. The perimetral member 1 is made with tightening holes 5 for hold-down bolts, oil holes 20, water holes 21, additional hole 22 doubling as a tightening hole and as a oil passage, and so on.

Figure 2:
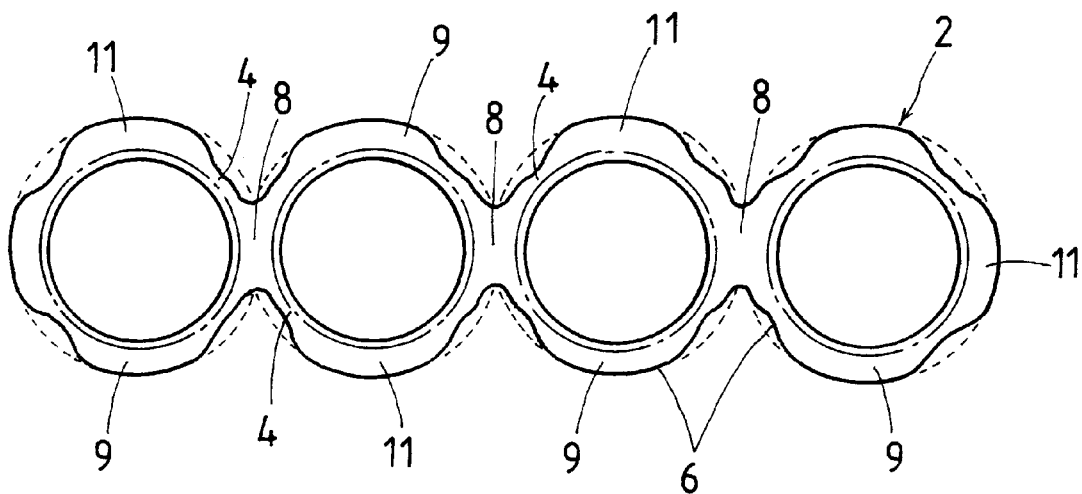
FIG. 2 is a top plan view showing a core plate surrounding bore apertures in the monolayer metal gasket shown in FIG. 1.
Figure 3:
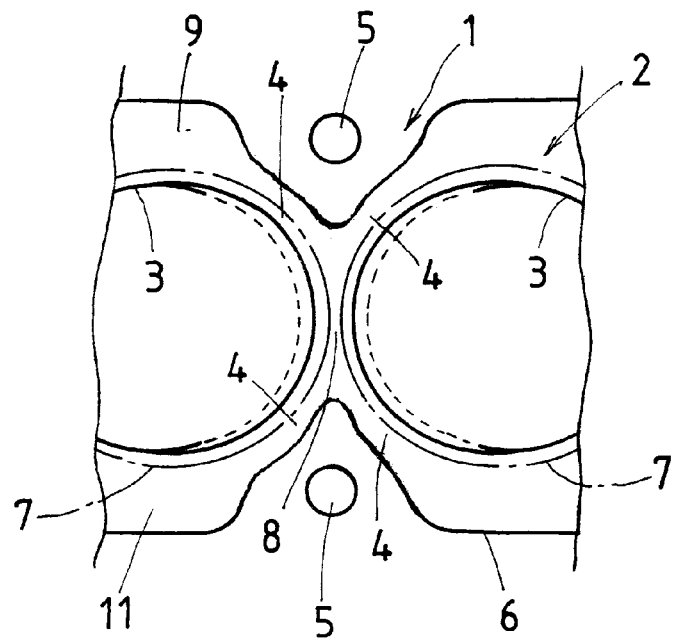
FIG. 3 is an enlarged top plan view showing another embodiment of the present invention at an area encircled with a dashed line IV in FIG. 1.

With the monolayer metal gasket constructed as described above, the core plate 2 surrounding the bore apertures 3 is made varied continually in radial width, depending on a sealing stress distribution around the bore apertures 3. The variation in radial width of the core plate 2 circumferentially of any bore aperture 3 results in compensating partly for a sealing stress distribution around the bore apertures 3. The monolayer metal gasket of the present invention, especially shown in FIGS. 1 and 2, has the core plate 2 that is varied in its radial width circumferentially of any bore apertures 3 within a range of from any areas 11 of enlarged width to other areas 4 of reduced width. The core plate 2 in which the areas 4 of minimum width are arranged in any areas neighboring the tightening holes 5 is preferable for the engine of the type in which the engine block is made relatively large in the area between any adjoining bore apertures 3. In contrast, a monolayer metal gasket according to another embodiment of the present invention shown in FIG. 3 has a core plate 2 in which the areas 4 of minimum width are arranged in the areas between any adjoining bore apertures 3 and also neighboring the tightening holes 5, and further the areas 4 of minimum width are equal in width with bridges 8 extending between the adjoining bore apertures 3. As the core plate 2 and perimetral member 1 are assembled in a single layer, the monolayer metal gasket is too tough to considerably reduce the width between any two adjoining bore apertures 3 in the core plate 2. Thus, the monolayer metal gasket constructed as in FIG. 3 is preferably applied for the engine in which it is inevitable to compensate for the sealing stress.

Moreover, the bridges 8 in the core plate 2 have any width extending across the area between any adjoining bore aperture 3, which may be made either equal to or different from each other at every area between the adjoining bore apertures 3, in other word, at every space between any adjacent cylinder. The feature of the monolayer metal gasket of the present invention, in basic principle, resides in the core plate 2 around the bore apertures 3, which is made minimum in its own radial width at the areas nearby the tightening holes 5 formed in the perimetral member 1 while made larger as in the areas 11 as it rocedes in circumferential distance from the tightening holes 5.

In the monolayer metal gasket of the present invention, the beads 7 on the core plate 2 are not changed locally in height, but kept at a height constant circumferentially of the bore apertures 3. The beads 7 are free from any change in height. The bead 7 is shown formed in an annular pattern viewed in its top plan, but is not limited to such a pattern and may be somewhat modified depending on the shapes of the bore apertures 3, the positions of the tightening holes 5 and corresponding minute variations in sealing stress to be balanced. The bead 7 on the core plate 2 may be raised above any one surface of the core plate 2, that is to say, is allowed to rise towards either the cylinder head or the cylinder block. Moreover, the width of the bead 7 on the core plate 2 may be made simply uniform throughout around the bore apertures 3. Nevertheless, the width crosswise the bead 7 may, if desired and under some conditions, be varied arbitrarily at any area circumferentially of the bore apertures 3 in favor of the uniformity of sealing stress, the fine compensation for variations on the sealing stress, the regulation of sealing stress to ensure the controlled sealing stress at any desired area, and so on.

On production of the monolayer metal gasket of the present invention, the core plate 2 and the perimetral member 1 are made of individual elastic metal sheets that are diverse in thickness from each other. The core plate 2 is formed in a combination of annular areas 9 around the core apertures 3 and the bridges 8 connecting any adjacent annular areas 9 to one another.

In the monolayer metal gasket, the annular areas 9 around the bore apertures 3 in the core plate 2 may be shaped either similar or dissimilar with each other in top plan configuration. Moreover, the monolayer metal gasket to be used in, for example, either 3-cylinder engine or 4-cylinder engine has not to make identical the configuration at the opposite sides of the individual cylinder.

The top plan configuration of the core plate 2 formed by lines joining the perimetric edges at the wider radial areas 11 of the annular areas 9 may be made in an arbitrary shape such as polygon, quadrangle, and so on, other than substantially circular shape. The core plate 2 in which the annular areas 9 around the cylinder bore-aligned apertures 3 are integrally connected in series with the bridges 8 is made out of an elastic metallic sheet by blanking operation.

Assembling the core plate 2 with the perimetral member 1 completes the monolayer metal gasket of the present invention. Assembly of the core plate 2 with the perimetral member 1 may be accomplished by any fastening method of butt welding, lap welding, mechanical caulking, and so on. In order to stave off formation of offsets or very edges at lap joints, it is preferred to join together the core plate 2 and the perimetral member 1 with split welds or, though not shown, trim the edges of the lapped portions in a smooth-faced contour.

As shown in FIGS. 7, 8, 9 and 10, the monolayer metal gasket of the present invention may be provided with an auxiliary bead 10 that itself is disclosed in Japanese Patent Application No. 323809/1998. The auxiliary bead 10 is made of a substance exhibiting sealing effect, for example, synthetic polymers such as fluorine-contained rubber, urethane polymer and others. The auxiliary bead 10 may be formed to replace parts of welds to joint together the core plate 2 and the perimetral member 1, thereby rendering welding operation lighter.

The monolayer metal gasket of the present invention may allow at least one row of the bead 7 around any bore aperture 3 to unite together with any neighboring bead 7 around the adjacent bore aperture 3 at any area between the bore apertures 3 adjacent to each other. In case where only one bead 7 unites together with another neighboring bead 7 around any other bore aperture 3 into a common bead, it is preferable to adjust properly the spring constant at junction areas where the neighboring beads merge in the common bead, keeping the junction areas small in changes in its own bead width and crosswise configuration, thereby lowering the peak value of the sealing stress in the junction areas to render small the drop in sealing stress, which might otherwise happen at the junction areas defined with the common bead and the neighboring individual beads. The detailed construction of the junction areas described above is disclosed in, for example, Japanese Patent Laid-Open No. 74343/1994.

Both the core plate 2 and the perimetral member 1 may be made of any metallic material selected from mild steel, spring steel, metals having a capability to harden when subjected to heat-treatment such as quenching, heating and others, cast irons, stainless steels, aluminum alloys, and so on. The core plate 2 and the perimetral member 1 may be made of materials unlike each other. In addition, the core plate 2 and the perimetral member 1 may be coated on their own opposite faces with any non-metallic substance. The surface or area to be coated of the core plate 2 and perimetral member 1 is properly selected, whether partially or entirely. Moreover, each thickness of the core plate 1 and perimetral member 2 should be dependent on the design requirements of engine and the ratio in thickness of the core plate 2 and the perimetral member 1 is never determined previously.

Referring next to FIGS. 4 to 12, there are illustrated the diverse embodiments of the monolayer metal gasket according to the present invention. Like reference numerals designate identical or corresponding parts or components and, to that extent, the repetition will be omitted hereinafter. Particularly in FIGS. 4 to 10, each section denoted by a reference character (A) illustrates the monolayer metal gasket taken along an area 11 where the core plate 2 has the large radial width, whereas another section denoted by a reference character (B) is the monolayer metal gasket taken along other area 4 where the core plate 2 is decreased in radial width. Any bead 7 around the associated bore aperture 3 is considered formed in a pattern with conformity of the perimetric edge of the bore aperture 3.

Figure 4:
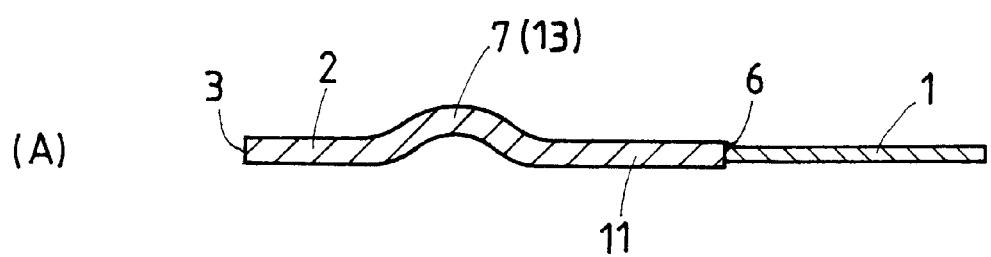
FIGS. 4(A) and 4(B) are enlarged sectional views showing a first embodiment of the monolayer metal gasket according to the present invention, and are taken along the line I—I and the line II—II of FIG. 1, respectively.
Figure 4:
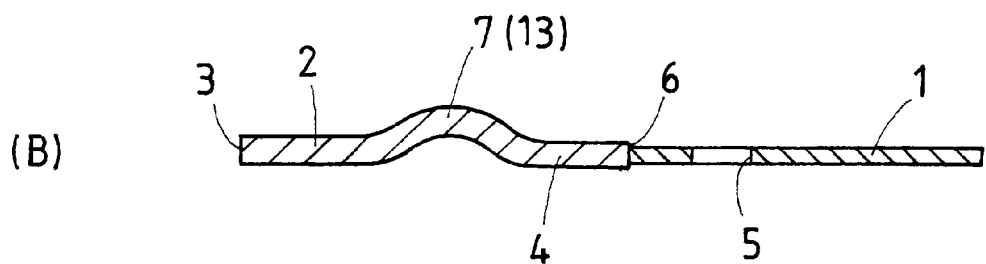

Referring first to FIG. 4, there is explained a first embodiment of the monolayer metal gasket according to the present invention. The monolayer metal gasket in (A) of FIG. 4 is shown in the section along the line I—I of FIG. 1, where the core plate 2 increases in its radial width, while the monolayer metal gasket in (B) of FIG. 4 is the section taken along the line II—II of FIG. 1, where the core plate 2 decreases in radial width.

The core plate 2 in the first embodiment is provided thereon with a row of the bead 7, or a full bead 13 around the bore aperture 3 formed in the core plate 2. The perimetral member 1 surrounds the perimetric edge 6 of the core plate 2. In the neighborhood of the tightening holes 5, the core plate 2 is reduced in radial width.

Figure 5:
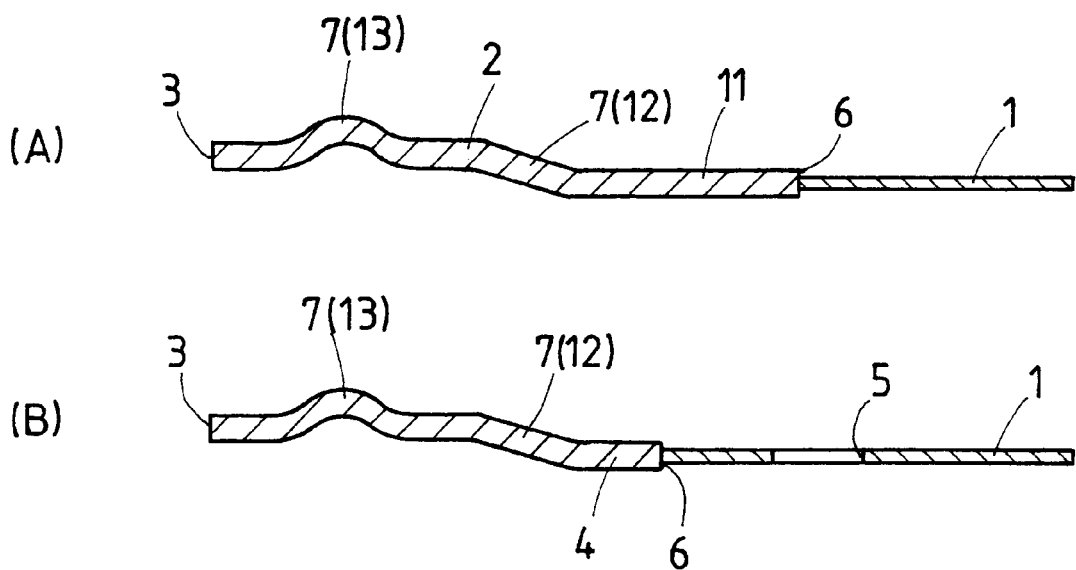
FIGS. 5(A) and 5(B) are enlarged sectional views showing a second embodiment of the monolayer metal gasket according to the present invention, and are taken along the line I—I and the line II—II of FIG. 1, respectively.

A second embodiment of the monolayer metal gasket is shown in FIG. 5, in which the illustration (A) is the section taken along the line I—I of FIG. 1, where the core plate 2 increases in its radial width, while the illustration (B) is the section taken along the line II—II of FIG. 1, where the core plate 2 decreases in radial width.

The core plate 2 in the second embodiment is provided thereon with two rows of the bead 7, or an inside full bead 13 and an outside half bead 12 arranged concentrically around the bore aperture 3 formed in the core plate 2.

Figure 6:
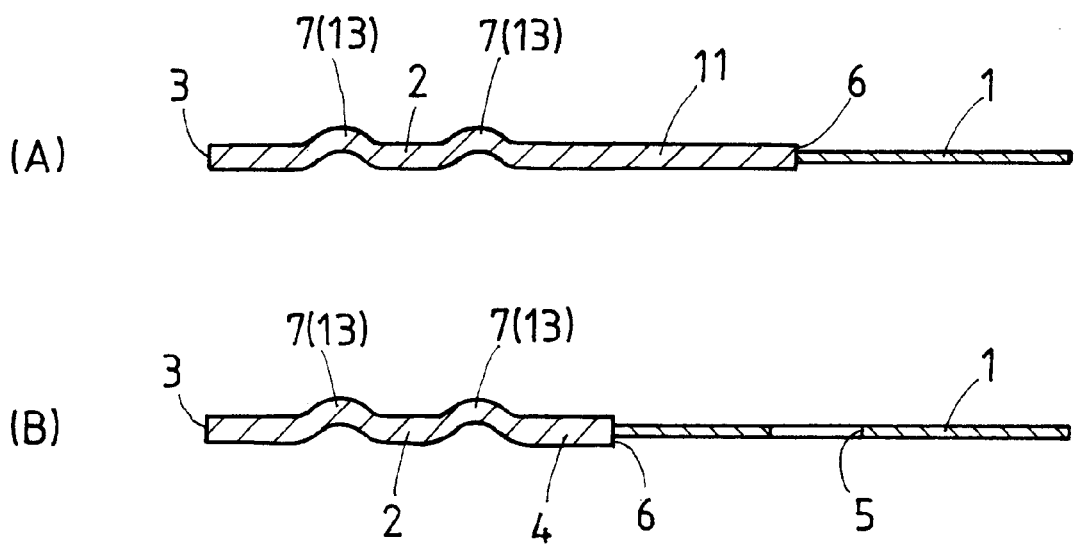
FIGS. 6(A) and 6(B) are enlarged sectional views showing a third embodiment of the monolayer metal gasket according to the present invention, and are taken along the line I—I and the line II—II of FIG. 1, respectively.

Referring next to FIG. 6, there is explained a third embodiment of the monolayer metal gasket according to the present invention. The monolayer metal gasket in (A) of FIG. 6 is shown in the section along the line I—I of FIG. 1, where the core plate 2 increases in its radial width, while the monolayer metal gasket in (B) of FIG. 6 is the section taken along the line II—II of FIG. 1, where the core plate 2 decreases in radial width.

The core plate 2 in the third embodiment is provided thereon with two rows of the bead 7, or an inside full bead 13 and an outside full bead 13 arranged concentrically around the bore aperture 3 formed in the core plate 2.

Figure 7:
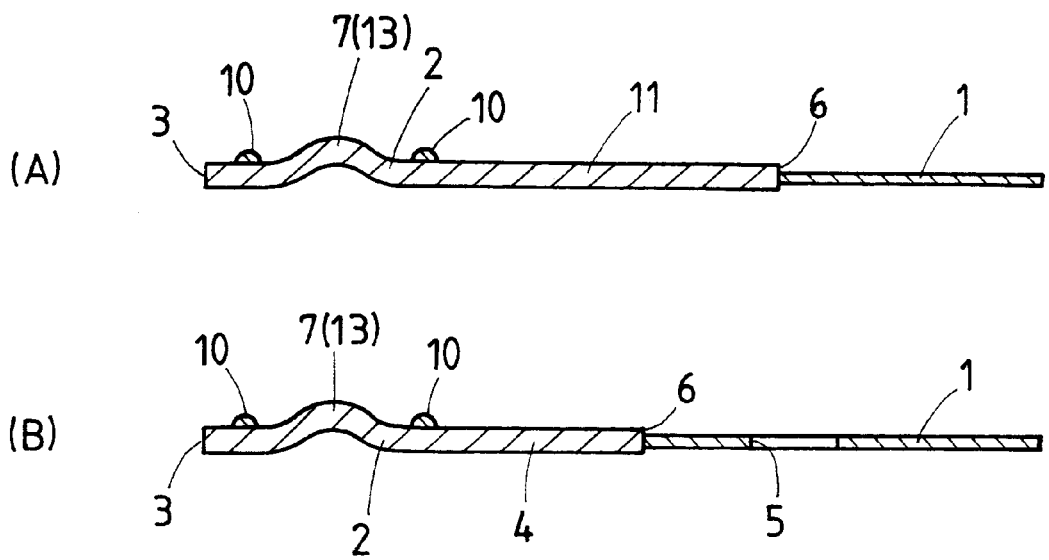
FIGS. 7(A) and 7(B) are enlarged sectional views showing a fourth embodiment of the monolayer metal gasket according to the present invention, and are taken along the line I—I and the line II—II of FIG. 1, respectively.

Referring further to FIG. 7, there is explained a fourth embodiment of the monolayer metal gasket according to the present invention. The monolayer metal gasket in (A) of FIG. 7 is shown in the section along the line I—I of FIG. 1, where the core plate 2 increases in its radial width, while the monolayer metal gasket in (B) of FIG. 6 is the section taken along the line II—II of FIG. 1, where the core plate 2 decreases in radial width.

The core plate 2 in the fourth embodiment is provided thereon with a row of the bead 7, or a full bead 13 around the bore aperture 3 formed in the core plate 2. Provided on radially opposite sides of the bead 7 are, moreover, auxiliary sealing beads 10 extending along the bead 7, each to each side. The auxiliary beads 10 in the fourth embodiment are raised towards the direction in which the bead 7 is raised above the core plate 2.

Figure 8:
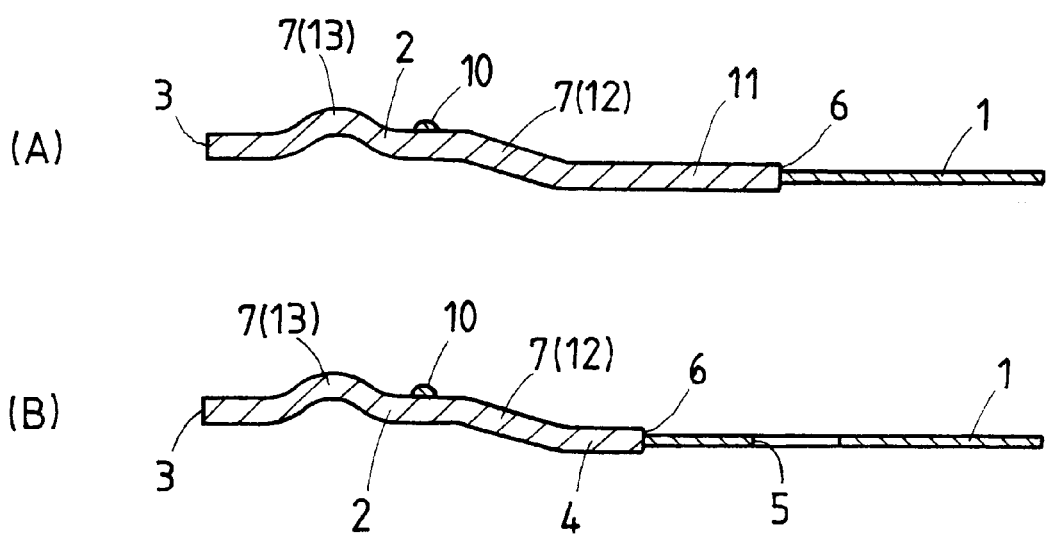
FIGS. 8(A) and 8(B) are enlarged sectional views showing a fifth embodiment of the monolayer metal gasket according to the present invention, and are taken along the line I—I and the line II—II of FIG. 1, respectively.

Referring to FIG. 8, there is explained a fifth embodiment of the monolayer metal gasket according to the present invention. The monolayer metal gasket in (A) of FIG. 8 is shown in the section along the line I—I of FIG. 1, where the core plate 2 increases in its radial width, while the monolayer metal gasket in (B) of FIG. 8 is the section taken along the line II—II of FIG. 1, where the core plate 2 decreases in radial width.

The core plate 2 in the fifth embodiment is provided thereon with two rows of the bead 7, or an inside full bead 13 and an outside half bead 12 arranged concentrically around the bore aperture 3 formed in the core plate 2. In addition an auxiliary sealing bead 10 is arranged extending between the full and half beads 13, 12. The auxiliary sealing bead 10 is raised towards the same direction as the beads 7 are raised. The auxiliary sealing bead 10, though shown arranged between the beads 7, may be alternatively arranged either inside the full bead 13 or outside the half bead 12.

Figure 9:
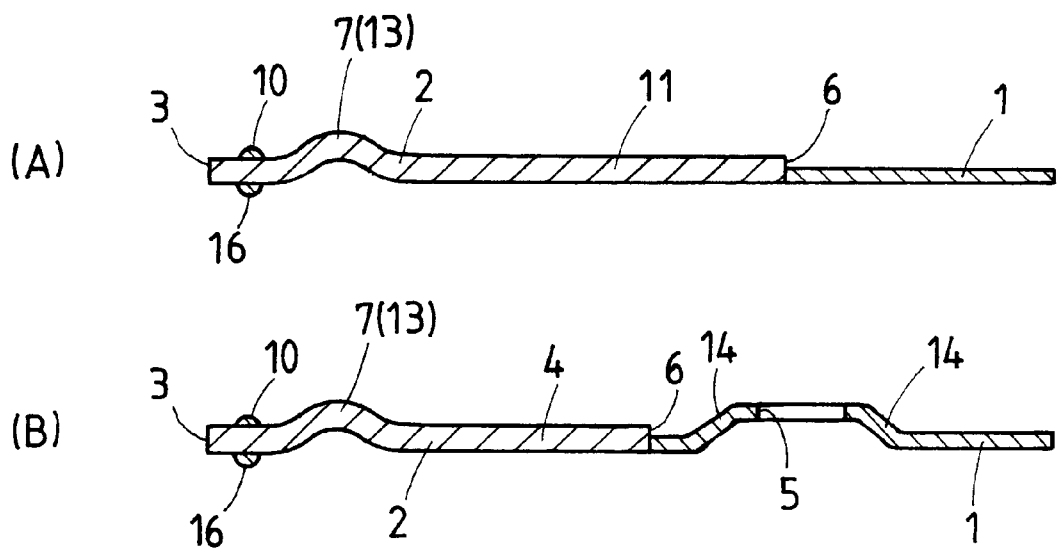
FIGS. 9(A) and 9(B) are enlarged sectional views showing a sixth embodiment of the monolayer metal gasket according to the present invention, and are taken along the line I—I and the line II—II of FIG. 1, respectively.

Referring next to FIG. 9, there is explained a sixth embodiment of the monolayer metal gasket according to the present invention. The monolayer metal gasket in (A) of FIG. 9 is shown in the section along the line I—I of FIG. 1, where the core plate 2 increases in its radial width, while the monolayer metal gasket in (B) of FIG. 9 is the section taken along the line II—II of FIG. 1, where the core plate 2 decreases in radial width.

The core plate 2 in the sixth embodiment is provided thereon with a row of the bead 7, or a full bead 13 around the bore aperture 3 formed in the core plate 2. Auxiliary sealing beads 10, 16 around the bore aperture 3 are disposed on the opposite surfaces of the core plate 2, each to each surface, at an annular area radially inside the full bead 13. In addition, the perimetral member 1 has a half bead 14 around a tightening hole 5.

Figure 10:
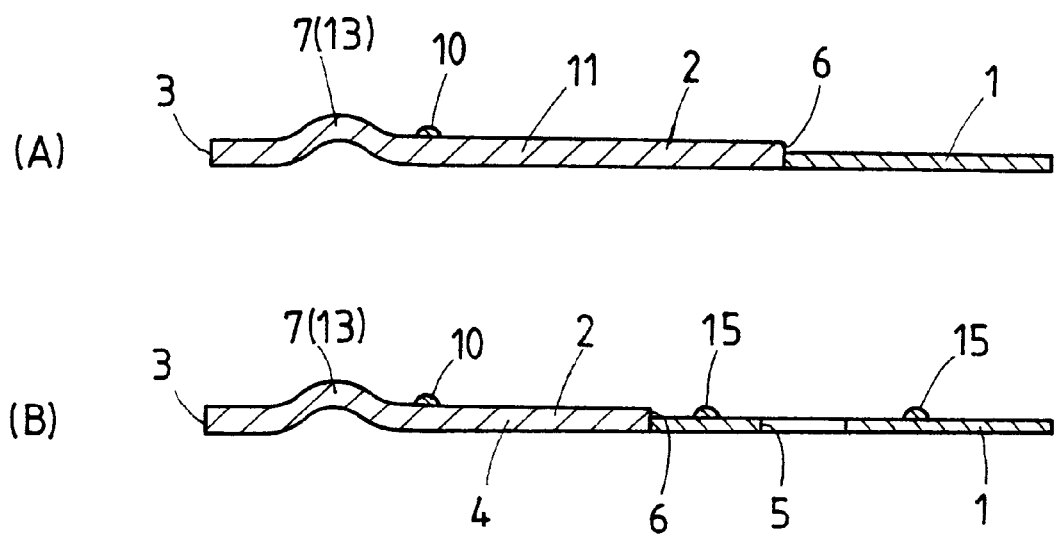
FIGS. 10(A) and 10(B) are enlarged sectional views showing a seventh embodiment of the monolayer metal gasket according to the present invention, and are taken along the line I—I and the line II—II of FIG. 1, respectively.

Referring to FIG. 10, there is explained a seventh embodiment of the monolayer metal gasket according to the present invention. The monolayer metal gasket in (A) of FIG. 4 is shown in the section along the line I—I of FIG. 1, where the core plate 2 increases in its radial width, while the monolayer metal gasket in (B) of FIG. 4 is the section taken along the line II—II of FIG. 1, where the core plate 2 decreases in radial width.

The core plate 2 in the seventh embodiment is provided thereon with a row of the bead 7, or a full bead 13 around the bore aperture 3 formed in the core plate 2. An auxiliary sealing bead 10 around the bore aperture 3 is disposed radially inside the full bead 13. The auxiliary sealing bead 10, though not shown, may be arranged outside the full bead 13. The auxiliary sealing bead 10 is also arranged on the surface of the core plate 2, above which the full bead 13 is raised. Another auxiliary sealing bead 15 is formed around a tightening hole in the perimetral member 1.

Figure 11:
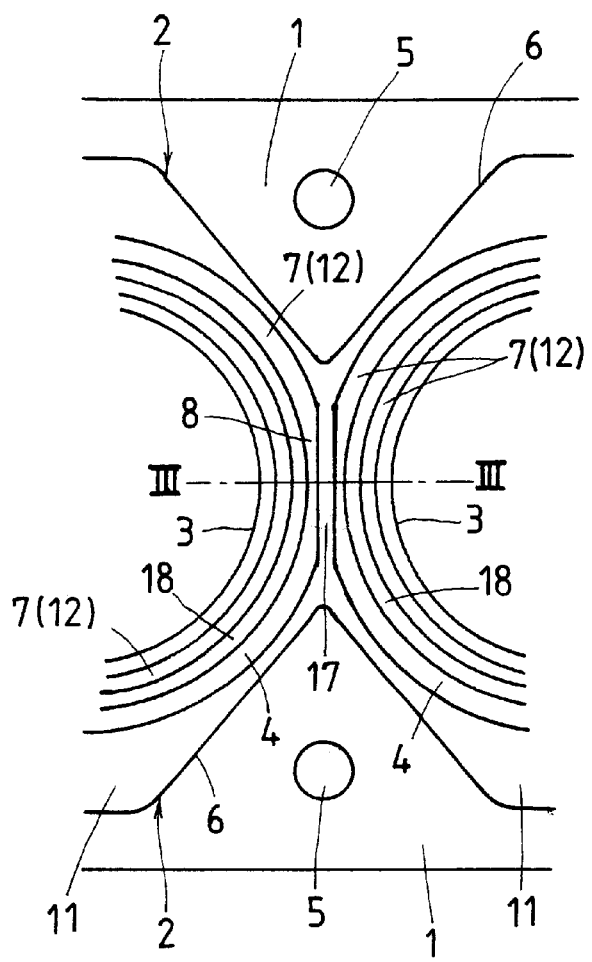
FIG. 11 is an enlarged top plan view showing another embodiment having two rows of the half bead extending around the associated bore aperture, at an area encircled with a dashed line IV in FIG. 1.
Figure 12:
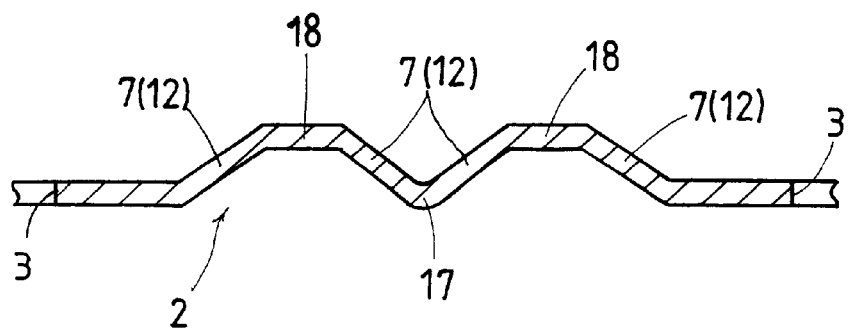
FIG. 12 is an enlarged section taken along the line taken along the line III—III of FIG. 11.
Figure 13:
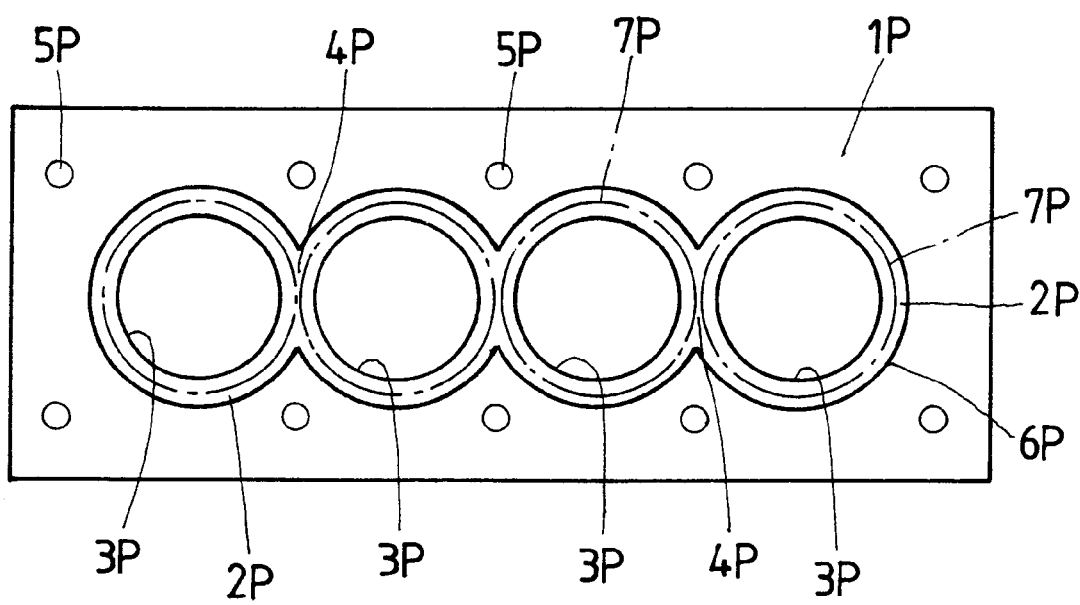
FIG. 13 is a top plan view explaining a core plate in a prior metal gasket.

Referring finally to FIGS. 11 and 12, there is shown an eighth embodiment of the monolayer metal gasket of the present invention. FIG. 11 is an enlarged top plan view showing the eighth embodiment at an area corresponding to the area encircled with a dashed line IV in FIG. 1, while FIG. 12 is a section taken along the line taken along the line III—III of FIG. 11.

The core plate 2 in the eighth embodiment has two rows of the half bead 12: an inside and outside half beads slanting in opposition to each other. The half beads 12, 12 extend around the bore aperture 3 in parallel so as to provide an annular flat zone 18 between them, with not merging in a common bead. In the eighth embodiment, the adjacent outside half beads 12 around the adjoining bore apertures 3 come closer to each other at the area between the adjoining bore apertures 3 to form junction areas 17 resembling the full bead. The junction areas 17 help ensure the desirable compensation for the sealing stress throughout around the associated bore aperture 3. Even if the core plate 2 is made with only a row of the half bead around the bore aperture 3, the half beads adjacent with one another, though not shown, are allowed to come closer to each other at the bridge 8 to form the junction areas resembling the full bead.

While the present invention has been described in its preferred embodiments, it is to be distinctly understood that the invention is not limited thereto but may be otherwise variously embodied within the scope of the following claims.

What is claimed is:

1. In a monolayer metal gasket adapted to be used disposed between mating surfaces of a cylinder block and cylinder head held together with tightening bolts, the metal gasket comprising a core plate formed in a combination of areas surrounding bore apertures in the cylinder block and provided thereon with beads extending around the bore apertures and bridges connecting in series any adjacent two of the areas to one another, and a perimetral member extending around the core plate and joining with a perimetric edge of the core plate, the core plate being made greater in thickness than the perimetral member;

wherein the core plate around the bore apertures is made small in radial width at areas subjected to a large squeezing force exerted by the tightening bolts, while made large in radial width at other areas where the tightening force is less than the large squeezing force, with the radial width being varied continually around the bore apertures, whereby the variation in radial width of the core plate serves together with the beads to adjust a sealing stress distribution around the bore apertures.

2. A monolayer metal gasket constructed as defined in claim 1, wherein the bridges in the core plate which may extend across an area between any adjoining bore apertures may have different widths between any of the adjoining bore apertures.

3. A monolayer metal gasket constructed as defined in claim 1, wherein the core plate around the bore apertures is made a minimum in radial width at areas neighboring tightening holes formed in the perimetral member.

* * * * *